United States Patent [19]

Götz et al.

[11] 3,986,229

[45] Oct. 19, 1976

[54] EXTERNAL PULL HANDLES AT MOTOR VEHICLE DOORS

[75] Inventors: Hans Götz, Boblingen; Manfred Kürsten, Magstadt, both of Germany

[73] Assignee: Daimler-Benz Aktiengesellschaft, Germany

[22] Filed: Jan. 24, 1975

[21] Appl. No.: 543,916

[30] Foreign Application Priority Data

Jan. 26, 1974 Germany ............................ 2403690

[52] U.S. Cl. ................................ 16/111 R; 16/1 R

[51] Int. Cl.[2] ........................................ B60N 3/02

[58] Field of Search .............. 16/125, 111 R, 110 R, 16/1; 296/15, 91, 146

[56] References Cited

UNITED STATES PATENTS 3,183,549 5/1965 Hammesfahr ........................ 16/125

FOREIGN PATENTS OR APPLICATIONS 1,176,012 8/1964 Germany ............................ 16/125

*Primary Examiner*—Andrew V. Kundrat
*Attorney, Agent, or Firm*—Craig & Antonelli

[57] ABSTRACT

An external pull handle at motor vehicle doors with a soil-protecting arrangement which is constituted by a cover cap that is open toward the rear and covers the forward area of the pull handle; the cover cap is provided with an enlargement caused by an offset as viewed in a direction opposite the driving direction.

33 Claims, 6 Drawing Figures

FIG. 1
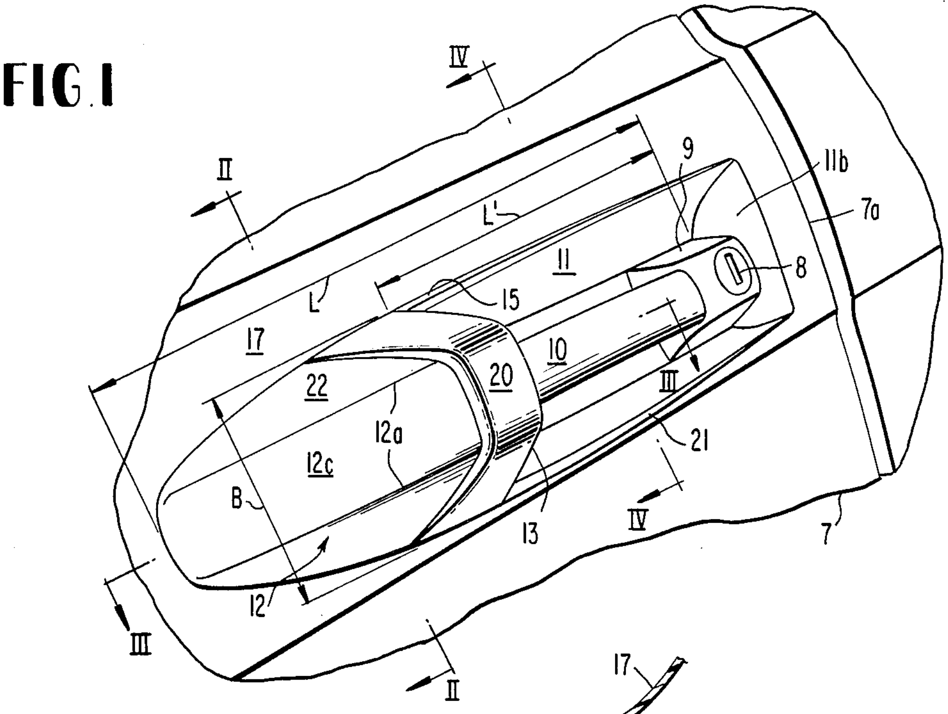
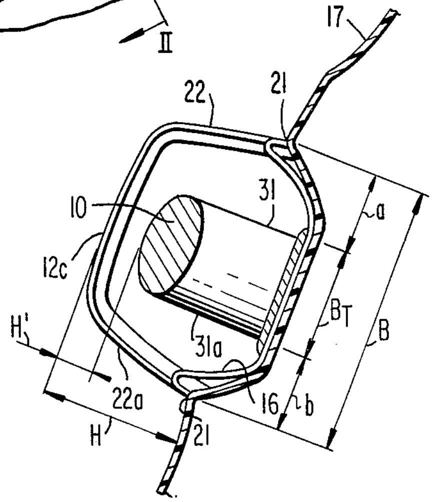
FIG. 2
FIG. 3
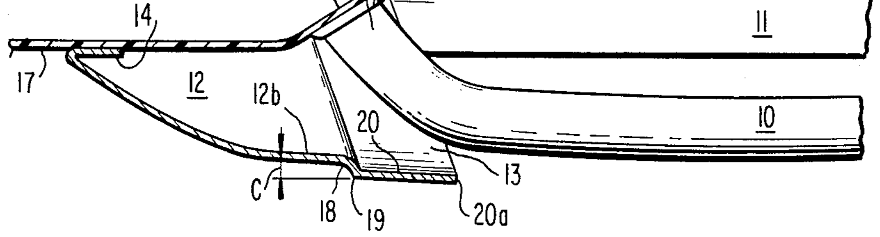

FIG. 4
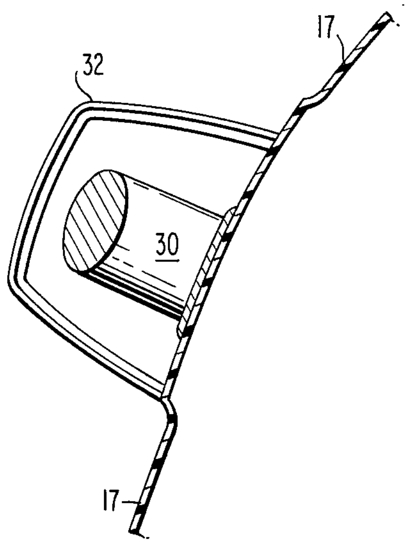
FIG. 5
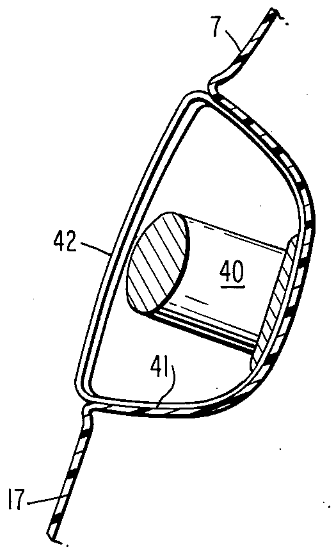
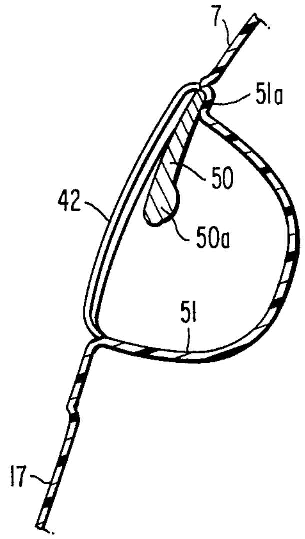
FIG. 6

EXTERNAL PULL HANDLES AT MOTOR VEHICLE DOORS

The present invention relates to an external pull handle at motor vehicle doors with an anti-soiling protection, in order to keep the handle free of annoying dirt deposits. The dirt deposits stem, as is known, not only from dirt particles which are being thrown up by the wheels of the vehicle itself, but predominantly from vehicles which drive in front of the vehicle or drive in the opposite direction.

Prior art arrangements for safe-guarding against soiling or icing of the door handles and locks, for example, according to the German Gebrauchsmuster No. 1,991,875 consist of a casing or cover adapted to be placed or inserted over the door handle within the area of the key lock and of an elastic hose closure with sealing lips for the key lock. The main handle part, properly speaking, of the door handle, however, remains unprotected with this approximately cup-shaped casing provided with a hose covering. With each gripping of the door handle, the hand or the glove becomes wet or soiled — and in cold seasons the handle part will be covered with ice.

The present invention is concerned with the task to attain for vehicle door handles, which as is customary project out of the handle recess over the vehicle outer body panels, or for those which are recessed completely in the handle recess, an effective soiling protection of the handle inclusive of the protection of the lock cylinder or of the key lock with slight expenditures.

The underlying problems are solved according to the present invention in that the forward area of the pull handle is overlapped by a cover cap extending forwardly beyond the door handle and open in the rear direction, which — as viewed opposite to the driving direction — includes an enlargement produced by an offset step.

In one advantageous embodiment of the present invention with a pull handle arranged in a handle recess, the cover cap is constructed approximately U-shaped in cross section, which tapers forwardly toward its web and terminates at the forward recess rim. The cover cap extends preferably over at least one-fourth of the length of the pull handle and is disposed with approximately two-thirds of its own length in front of a handle trough or recess.

Furthermore, the handle recess is lined or covered advantageously with an approximately trough-shaped lining which forms the bottom of the mounting base or socket. The lining may be inserted into the free opening edge of the cover cap or may be clamped together with the same; it may also be connected therewith in one piece.

Significant to the soil-deflecting effect of the cover cap over the entire handle area is the fact that its edge cuff is sufficiently wide and is provided with a sharp, rear detaching edge. Appropriately, a width of the edge cuff of about one-fourth the cap length is provided, whereby soiling of the handle is far-reachingly precluded during the drive. The edge cuff serves for conducting away the thrown-up dirt which is caught by the beginning portion of the cap and is conducted along by the latter.

Of equal importance is the rise of the edge cuff provided in the shape of a specially constructed step, beyond the cap beginning portion. This step lies between the forward section of the cap which is extended up in front of the handle recess, and the cuff edge which adjoins the same to the rear thereof. The step brings about that the thrown up dirt is conducted away toward the outside.

The dimensions and maintenance of a special position of the handle have also proved as essential; the handle is thereby arranged half-recessed in a handle-recess. With these handles the width of the handle recess in the plane of the cap opening is approximately equal to the same. They have a size and dimension which results from the width of the external handle plus approximately 17/70 of the length of the pull handle part projecting out of the cover cap. The pull handle is thereby so arranged that the distance ($a$) remains between its top edge and the cover cap, which amounts to about 10/70 of the pull handle length ($L'$) projecting out of the cover cap, and the distance ($b$) remains between its lower edge and the cover cap, which amounts to about 7/70th of the pull handle length portion ($L'$) projecting out of the cover cap.

The cover cap serving as soil deflector, however, may also have a lower structural height and may thereby project only slightly from the vehicle outer body panel when the pull handle is thereby recessed partly or completely in the vehicle body or in a handle recess.

It has proved appropriate in general that the cuff edge of the cap extends over the external pull handle by a height by about 1/12th of the handle portion projecting rearwardly out of the cover cap inclusive the socket or base. Similarly of importance for an effective dirt discharge is the step height which should amount to about 1/10th of the cap height.

Accordingly, it is an object of the present invention to provide an external pull handle for motor vehicle doors which avoids by simple means the aforementioned shortcomings and drawbacks encountered in the prior art.

Another object of the present invention resides in an external pull handle arrangement for motor vehicle doors which keeps the handle essentially free of annoying dirt, regardless of whether the dirt is thrown up by the wheels of the vehicle itself or by vehicles which are oncoming, precede or pass the vehicle in question.

A further object of the present invention resides in an effective soil protection for a pull handle of a vehicle door which not only protects the handle against soiling but also the lock cylinder and key lock thereof.

A further object of the present invention resides in a door handle construction, which is simple, involves relatively few inexpensive parts and can be installed in a simple manner.

These and further objects, features and advantages of the present invention will become more apparent from the following description when taken in connection with the accompanying drawing which shows, for purposes of illustration only, several embodiments in accordance with the present invention and wherein:

FIG. 1 is a perspective view of an external pull handle in accordance with the present invention, half-recessed in a handle recess at a motor vehicle door, as viewed obliquely from above;

FIG. 2 is a cross-sectional view illustrating certain details of the pull handle and handle recess, taken along line II—II of FIG. 1;

FIG. 3 is a longitudinal cross-sectional view through the pull handle and handle recess according to line III-III of FIG. 1;

FIG. 4 is a transverse cross-sectional view taken along line IV—IV of FIG. 1; and FIGS. 5 and 6 are transverse cross-sectional views, similar to FIG. 4, and illustrating modified embodiments of a door handle and handle recess in accordance with the present invention.

Referring now to the drawing wherein like reference numerals are used throughout the various views to designate like parts, a vehicle door 7 (FIG. 1) of a motor vehicle is provided in a customary manner near its rear edge *7a*, as viewed in the driving direction, with a lock, whose lock cylinder 8 is arranged in a socket or base 9. The socket or base 9 serves simultaneously as fastening means of an external pull handle 10 which serves for pivoting the door in the opening direction.

The pull handle 10 which is slightly curved in its main part and is more strongly angularly bent off in its forward and rear portion (FIGS. 2 and 3) is like the socket 9 partly recessed in a handle trough or recess 11 with obliquely outwardly rising end walls 11*a* and 11*b* and is secured with its forward end 10*a* at the forward recess wall 11*a* (FIG. 3). The distance of the rear recess end 11*b* to the fastening socket or base 9 forms a wedge-shaped intermediate space.

The external pull handle 10 has a width $B_T$ (FIG. 2) which is slightly wider than one-third of the recess width B. A cover cap generally designated by reference numeral 12 which includes a rearwardly directed opening 13 is securely arranged as a dirt reflector at the door outer body panel 17 and more particularly at the edge of the handle recess 11 within the area of the forward fastening end 10*a* of the outer pull handle 10.

The cover cap 12 has approximately the length L′ of the free handle portion projecting rearwardly out of the cover cap 12 so that the cover cap 12 and the free handle portion have approximately the length $2L' = L$ (FIG. 1). A folded-over edge 14 (FIG. 3) serves for fastening the cover cap 12 on the outer body panel 17 of the door. The cover cap 12 overlaps approximately one-fourth of the outer pull handle 10 and extends forwardly on the door outer body panel 17 beyond the handle recess 11 by about twice the amount of this portion. Its opening 13 (FIG. 3) toward the rear extends over the entire width of the recess 11 which at the opening edge 21 (FIG. 2) is approximately three times as wide as the external pull handle 10. The cover cap 12 has an approximately U-shaped cross section; its lateral legs 22 and 22*a* form together with the web 12*c* rounded off edges 12*a* (FIG. 1).

The handle recess 11 is lined in its rear part 15 disposed to the rear of the cover cap 12 with an approximately trough-shaped lining 16 of scratch-resistant synthetic resinous material whose upper edge 21 which extends approximately in an identical manner with the recess edge, is connected with the cap edge 14.

Appropriately, the cover cap 12 consists of an abration- and wear-resistant, as well as temperature-resistant synthetic plastic material, for example, of a synthetic resinous material of conventional type which advantageously should also be scratch-resistant. The outwardly disposed web surface 12*c* of the cover cap 12 includes at approximately half of its length, a section 12*b* which is bent off into a plane approximately parallel to the outer recess edges 21 (FIGS. 2 and 3). This section 12*b* terminates in a sharp outwardly pointing curvature 18 which terminates rearwardly in a short rise 19, whose outer end passes over rearwardly at an obtuse angle into an edge cuff 20. The curvature 18 and the inclined rise 19 form a step on the cap outer side, and the latter serves the purpose to deflect the dirt thrown against the cap 12. The rear end 20a (FIG. 3) of the edge cuff 20 may be sharpened as a detaching edge; the dirt deposit on the edge cuff 20 is thereby effectively torn away by the aerodynamic force over the pull handle 10 and the handle recess 11.

The relations of the dimensions of the external pull handle 10, of the freely projecting handle part L′ and of the handle recess 11 are thereby of significance. The width B of the handle recess 11 and of the cover cap 12 is composed of the pull handle width $B_T$, increased by about one-seventh and finally by about one-tenth the length L′ of the freely projecting handle part.

Additionally, the handle part must be so arranged that its upper edge 31 has a distance *a* (FIG. 2) of about $10/70 = 1/7$ L′ from the upper rim edge of the handle recess 11 and its lower edge 31*a* has a distance *b* of about $7/70 = 1/10$ L′ from the lower rim edge of the handle recess 11.

The cuff edge 20 of the covering cap 12 which overlaps the forward one-fourth part of the pull handle length has preferably a width of about ¼ of the length of the cover cap 12. Both legs 22 and 22*a* are considerably tapered toward the folded edge 14 whereas the web 12*c* decreases only slightly in its width.

Of significance is also the maintenance of the interior height of the outer pull handle 10 to the edge of the opening 13. This height was advantageously determined with about 1/12th of the pull handle length L′ in the rear recess part 15.

The cover cap 32 (FIG. 4) with correspondingly matched dimensions may be provided with approximately the same deflection success over the forward part of pull handles 30 projecting freely over the door outer side 17. The same deflection effect occurs with a door handle 40 completely recessed in a handle recess 41 and with a cover cap 42 nearly completely reduced to the plane of the outer body panel of the door (FIG. 5). Finally, a dirt deflection takes place also by a cover cap 42 reduced to a similar extent which is disposed over a pull handle 50 of about half the width of the handle recess 51 and secured at the upper recess edge 51*a* of the handle recess 51. The pull handle 50 is reinforced at its free end on the bottom side thereof with a bulge or bead 50*a* (FIG. 6) which represents a good engagement for the finger of the hand seeking to actuate the handle.

While we have shown and described several embodiments in accordance with the present invention, it is understood that the same is not limited thereto but is susceptible of numerous changes and modifications as known to those skilled in the art, and we therefor do not wish to be limited to the details shown and described herein but intend to cover all such changes and modifications as are encompassed by the scope of the appended claims.

We claim:

1. An external pull handle for motor vehicles doors with soil-protecting, characterized in that the forward area of the external pull handle is overlapped by a covering cap means spaced therefrom and open toward the rear, said cover cap means being provided with an enlargement adjoining its open end and produced by a step means as viewed opposite the driving direction.

2. An external pull handle according to claim 1, characterized in that the cover cap means extends forwardly beyond the door handle.

3. An external pull handle according to claim 2, characterized in that the cover cap means is constructed approximately V-shaped in cross section, includes a web portion and tapers in the forward direction up to its web portion, said cover cap means covering at least about one-fourth the length of the pull handle.

4. An external pull handle for motor vehicles doors with soil-protecting, characterized in that the forward area of the external pull handle is overlapped by a covering cap means open toward the rear, said cover cap means being provided with an enlargement produced by a step means as viewed opposite the driving direction, characterized in that the cover cap means extends forwardly beyond the door handle, characterized in that the cover cap means is constructed approximately V-shaped in cross section, includes a web portion and tapers in the forward direction up to its web portion, said cover cap means covering at least about one-fourth the length of the pull handle, and characterized in that the cover cap means is arranged with two-thirds of its length in front of a handle recess means.

5. An external pull handle according to claim 4, characterized in that the handle recess means has approximately three times the handle width from edge to edge thereof within the plane of the cover cap opening.

6. An external pull handle according to claim 5, characterized in that the step-shaped enlargement is adjoined by an edge cuff means which has approximately one-fourth the overall length of the cover cap means.

7. An external pull handle according to claim 6, characterized in that the edge cuff means has a sharp rear detaching edge.

8. An external pull handle according to claim 7, characterized in that the step means is provided ahead of the edge cuff means with a sharp curvature toward the outside and with an adjoining short rising portion.

9. An external pull handle according to claim 8, characterized in that the cover cap means has approximately the same width as the handle recess means and in that both are about as wide as the external pull handle width plus about 17/70 of the pull handle length portion projecting rearwardly out of the cover cap means.

10. An external pull handle according to claim 9, characterized in that the pull handle is so arranged that a distance remains between its upper edge and the cover cap means of about 10/70 of the pull handle length portion projecting out of the cover cap means whereas a distance remains between its lower edge and the cover cap means which corresponds approximately 7/70 of the pull handle length portion projecting out of the cover cap means.

11. An external pull handle according to claim 10, characterized in that the free cover cap extends over the pull handle at a height of about 1/12 of the length of the pull handle portion extending rearwardly of the cover cap means.

12. An external pull handle according to claim 11, characterized in that the step means to the cuff edge of the cover cap means only has a height which is about 1/10 of the largest cap height as measured over the handle recess bottom.

13. An external pull handle according to claim 12, characterized in that the pull handle secured at the upper recess edge is about half as wide as the recess means and includes at its free end a bead-shaped reinforcement.

14. An external pull handle according to claim 1, characterized in that the cover cap means is constructed approximately V-shaped in cross section, includes a web portion and tapers in the forward direction up to its web portion, said cover cap means covering at least about one-fourth the length of the pull handle.

15. An external pull handle for motor vehicles doors with soil-protecting, characterized in that the forward area of the external pull handle is overlapped by a covering cap means spaced therefrom and open toward the rear, said cover cap means being provided with an enlargement produced by a step means as viewed opposite the driving direction, and characterized in that the cover cap means is arranged with two-thirds of its length in front of a handle recess means.

16. An external pull handle according to claim 15, characterized in that the cover cap means is covering at least about one-fourth the length of the pull handle.

17. An external pull handle according to claim 15, characterized in that the handle recess means has approximately three times the handle width from edge to edge thereof within the plane of the cover cap opening.

18. An external pull handle for motor vehicles doors with soil-protecting, characterized in that the forward area of the external pull handle is overlapped by a covering cap means open toward the rear, said cover cap means being provided with an enlargement produced by a step means as viewed opposite the driving direction, and characterized in that the step-shaped enlargement is adjoined by an edge cuff means which has approximately one-fourth the overall length of the cover cap means.

19. An external pull handle according to claim 18, characterized in that the edge cuff means has a sharp rear detaching edge.

20. An external pull handle according to claim 18, characterized in that the step means is provided ahead of the edge cuff means with a sharp curvature toward the outside and with an adjoining short rising portion.

21. An external pull handle according to claim 15, characterized in that the cover cap means has approximately the same width as the handle recess means and in that both are about as wide as the external pull handle width plus about 17/70 of the pull handle length portion projecting rearwardly out of the cover cap means.

22. An external pull handle according to claim 21, characterized in that the pull handle is so arranged that a distance remains between its upper edge and the cover cap means of about 10/70 of the pull handle length portion projecting out of the cover cap means whereas a distance remains between its lower edge and the cover cap means which corresponds approximately to 7/70 of the pull handle length portion projecting out of the cover cap means.

23. An external pull handle according to claim 1, characterized in that the free cover cap edge extends over the pull handle at a height of about 1/12 of the length of the pull handle portion extending rearwardly of the cover cap means.

24. An external pull handle according to claim 18, characterized in that the step means to the cuff edge of the cover cap means only has a height which is about 1/10 of the largest cap height as measured over the handle recess bottom.

25. An external pull handle for motor vehicles doors with soil-protecting, characterized in that the forward area of the external pull handle disposed at least partially in a recess means is overlapped by a covering cap means open toward the rear, said cover cap means being provided with an enlargement produced by a step means as viewed opposite the driving direction, and characterized in that the pull handle secured at an upper recess edge of said recess means is about half as wide as the recess means and includes at its free end a bead-shaped reinforcement.

26. An external pull handle for doors of vehicles, comprising handle means and soil-protecting means, said soil-protecting means including cover means for covering at least a portion of said handle means while being spaced therefrom, said cover means having an open end in a direction facing said handle means, and said cover means including step means for providing an enlargement at said open end such as to deflect soilage from said handle means.

27. An external pull handle according to claim 26, wherein said cover means includes an edge cuff portion extending between said step means and said open end, said edge cuff portion being approximately one-fourth the length of said cover means.

28. An external pull handle according to claim 27, wherein said edge cuff portion is provided with a sharp detaching edge at said open end.

29. An external pull handle according to claim 27, wherein said edge cuff portion extends above said handle means at a distance approximately one-twelfth the length of said handle means extending out of said cover means.

30. An external pull handle according to claim 26, wherein said step means is a step portion having a height of approximately one-tenth the height of said cover means.

31. An external pull handle according to claim 26, wherein said cover means and the portion of said handle means extending out of said cover means, each has approximately the same length.

32. An external pull handle according to claim 26, wherein said handle means are disposed at least partially within a recess means.

33. An external pull handle according to claim 32, wherein said handle means are entirely disposed within said recess means.

* * * * *